(12) United States Patent
Fritz et al.

(10) Patent No.: US 8,584,616 B2
(45) Date of Patent: Nov. 19, 2013

(54) METHOD FOR SUPPLYING A COATING SYSTEM WITH A PARTICULATE AUXILIARY MATERIAL

(75) Inventors: Hans-Georg Fritz, Ostfildern (DE); Jens Holzheimer, Tamm (DE); Dietmar Wieland, Waiblingen (DE)

(73) Assignee: Durr Systems GmbH, Bietigheim-Bissingen (DE)

( * ) Notice: Subject to any disclaimer, the term of this patent is extended or adjusted under 35 U.S.C. 154(b) by 610 days.

(21) Appl. No.: 12/675,041

(22) PCT Filed: Jul. 21, 2008

(86) PCT No.: PCT/EP2008/005961
§ 371 (c)(1),
(2), (4) Date: Feb. 24, 2010

(87) PCT Pub. No.: WO2009/026996
PCT Pub. Date: Mar. 5, 2009

(65) Prior Publication Data
US 2011/0059258 A1    Mar. 10, 2011

(30) Foreign Application Priority Data

Aug. 24, 2007 (DE) .......................... 10 2007 040 154

(51) Int. Cl.
*B05B 1/28* (2006.01)
*B05B 15/12* (2006.01)
*B05C 11/00* (2006.01)
*B05C 19/00* (2006.01)

(52) U.S. Cl.
USPC ............................. 118/326; 118/308; 118/602

(58) Field of Classification Search
USPC ............ 118/308, 309, 326, 602, 634, DIG. 7; 454/50, 53; 427/180; 55/DIG. 46
See application file for complete search history.

(56) References Cited

U.S. PATENT DOCUMENTS

| 1,601,897 A | * | 10/1926 | Wiley et al. ........................ 425/7 |
| 2,328,675 A | * | 9/1943 | Ribbans ..................... 366/152.2 |
| 3,960,323 A | * | 6/1976 | Ducan et al. ...................... 239/3 |
| 5,505,766 A |   | 4/1996 | Chang |
| 6,197,114 B1 | * | 3/2001 | Rodenberger ................ 118/623 |
| 2006/0266284 A1 | * | 11/2006 | Fritz et al. ..................... 118/308 |
| 2007/0062444 A1 | * | 3/2007 | Shutic et al. .................. 118/309 |

FOREIGN PATENT DOCUMENTS

| DE | 2930121 A1 | 2/1981 |
| DE | 42 11 465 A1 | 10/1993 |
| DE | 4211465 A1 | 10/1993 |

(Continued)

OTHER PUBLICATIONS

Computer English Translation DE19924130 A; Dec. 2000.*

(Continued)

*Primary Examiner* — Yewebdar Tadesse
(74) *Attorney, Agent, or Firm* — Bejin VanOphem & Bieneman PLC

(57) ABSTRACT

In order to separate an overspray of a liquid coating material from an air current flowing through the application region of a coating system, an overspray present in the air current may be charged with a particulate auxiliary material introduced in the air current. The new or fresh auxiliary material may be delivered from a feed container via a line arrangement into a container arrangement located in a region of the fluid flow outlet, e.g., beneath the application region.

13 Claims, 3 Drawing Sheets

(56) References Cited

FOREIGN PATENT DOCUMENTS

| | | | |
|---|---|---|---|
| DE | 19913448 A1 | 9/2000 |
| DE | 19924130 A1 * | 12/2000 |
| DE | 10125648 A1 | 11/2002 |
| DE | 69804959 T2 | 11/2002 |
| DE | 10130173 A1 | 1/2003 |
| DE | 102005013708 A1 | 9/2006 |
| DE | 102005013709 A1 | 9/2006 |
| DE | 102005013710 A1 | 9/2006 |
| DE | 102005013711 A1 | 9/2006 |
| DE | 102007040153 A1 | 2/2009 |
| EP | 1427536 A1 | 6/2004 |
| EP | 1704925 A2 | 9/2006 |
| JP | 52-56457 A | 5/1977 |
| JP | 53-109247 A | 9/1978 |
| JP | 62-227418 A | 10/1987 |
| JP | 02123025 A | 5/1990 |
| JP | 06278868 A | 10/1994 |
| JP | 10-296026 A | 11/1998 |
| JP | 2002346929 A | 12/2002 |
| WO | WO-9118679 A1 | 12/1991 |
| WO | WO-03024612 A1 | 3/2003 |
| WO | WO-2004087331 A1 | 10/2004 |
| WO | WO-2007039275 A1 | 4/2007 |
| WO | WO-2007039276 A1 | 4/2007 |
| WO | WO-2009026995 A1 | 3/2009 |

OTHER PUBLICATIONS

Human English Translation of DE 19924130 A, Dec. 2000.*

Computer Translation DE4211465 A1, Oct. 1993.*

* cited by examiner

METHOD FOR SUPPLYING A COATING SYSTEM WITH A PARTICULATE AUXILIARY MATERIAL

CROSS-REFERENCE TO RELATED APPLICATIONS

This application is a National Phase application claiming the benefit of International Application No. PCT/EP2008/005961, filed Jul. 21, 2008, which claims priority to German Patent Application No. DE 10 2007 040 154.1-51, filed Aug. 24, 2007, the complete disclosures of which are hereby incorporated herein by reference in their entireties.

BACKGROUND

The present disclosure relates to exemplary methods and devices for supplying a coating system with a particulate auxiliary material. This relates, for example, to a system for the automatic painting of vehicle bodies or parts thereof, e.g., by using painting robots.

Methods and apparatuses of this generic type are generally known, for example as described by WO 2007/039276 A1 and WO 2007/039275 A1 as well as from DE 10 2005 013 708 A1, DE 10 2005 013 709 A1, DE 10 2005 013 710 A1 and DE 10 2005 013 711 A1, each of which are hereby expressly incorporated by reference in their entireties. In accordance with these systems, the dry separation of the wet paint overspray from the exhaust air stream from the spray booth is effected in a filter apparatus after a flowable, particulate, so-called pre-coat material has been previously dispensed into the exhaust air stream by means of a nozzle arrangement. The purpose of the pre-coat material in these examples is for it to be deposited as a barrier layer on the filter surfaces in order to prevent these surfaces from clogging due to adhering overspray particles. For examples, lime, rock meal, aluminium silicates, aluminium oxides, silicon oxides, powder paint or the like are used as pre-coat material which is separated in the filter apparatus with the overspray. By periodically cleaning the filter apparatus, the mixture consisting of pre-coat material and wet paint overspray enters into reception containers, from where it can be partly directed to a renewed use as a pre-coat material. The reception containers are distributed beneath the application region over the entire horizontal booth cross-sectional surface. The nozzle arrangement dispensing the pre-coat material into the exhaust air stream is supplied by means of an injector from a feed container containing the pre-coat material in a flowable state.

Another method of the generic type mentioned above is generally disclosed by DE 4211465 C2 which is used for the dry separation, recovery and processing of a mist incident in spray painting operations and consisting of sticky paint particles from the exhaust air stream. This method involves the addition of a paint-compatible auxiliary dusty substance geared towards the recovery of the separated mist. Colour pigments or inorganic filler materials are to be used as paint-compatible auxiliary dusty substances. For the purposes of recovery, one part of the recovered auxiliary dusty substance is reintroduced into the circuit through the booth whilst the other part is discharged for processing this proportion to form new paint with the addition of fresh paint raw materials and/or solvents, and is supplemented by a fresh auxiliary dusty substance. The auxiliary dusty substance is injected by way of nozzles into a mixing chamber disposed beneath the application region, where the dust particles accumulate on the overspray particles in the booth air flowing through the mixing chamber. The exhaust air mist, pre-treated in this manner, from the mixing chamber is supplied to a filtering separator via an exhaust line and from there the part of the auxiliary dusty substance reintroduced into the booth circuit enters into an auxiliary dusty substance storage bin where it is mixed with a fresh auxiliary dusty substance which has been supplied in a metered manner. This mixture of fresh and recovered auxiliary dusty substances is forced, by a pneumatic transmitter, into a conveying line leading to the nozzles of the mixing chamber beneath the application region.

Accordingly, there is a need for a method and a device for supplying the coating system with the particulate auxiliary material which permit an improved charging of the overspray particles with the auxiliary material and simultaneously enable the auxiliary material to be conveyed in a particularly purposeful manner.

BRIEF DESCRIPTION OF THE DRAWINGS

The present disclosure will be explained in more detail using the exemplary illustrations shown in the drawings, in which.

DETAILED DESCRIPTION

The exemplary illustrations are generally based on the recognition that the charging and dry separation of a wet paint overspray can be improved if an auxiliary material is not conveyed from the feed container into a pre-coating lance and from there sprayed into the booth exhaust air, like the pre-coat material in the known systems, but rather instead is conveyed firstly into reception containers distributed beneath the booth base, where the fresh auxiliary material can then be introduced into the air flow containing the paint particles.

For example, an auxiliary material or pre-coat may be conveyed in this case not as in the known systems by an injector from the feed container through rigid pipelines, but rather in particular by a blow pot or a digital density feed (DDF) pump or the like through a flexible hose line. Hoses are less expensive and are easier to assemble than rigid pipelines and in addition can be more easily replaced if needed. Furthermore, hoses have the advantage that they permit a particularly simple control of the material flow at the branch points of the line arrangement leading to the individual reception containers by means of mechanical controls, e.g., mechanical squeeze valves.

If the feed container is formed as a blow pot, this arrangement advantageously meters filling of the reception containers more precisely with a relatively large delivery rate and also with relatively small amounts.

Blow pots are generally known, e.g., from JP 02123025 A or JP 06278868 A, and were previously used in practice in coating systems to convey powder paint to the application containers located in proximity to the atomisers. They are relatively small, closable containers having an air-permeable base through which air is fed for the purpose of fluidising the powder and for conveying it into the container. These containers were filled in portions in known systems possibly whilst monitoring the filling amount with undesirably complex weighing devices and were then generally completely emptied (except for a small residual amount).

Figure 3:
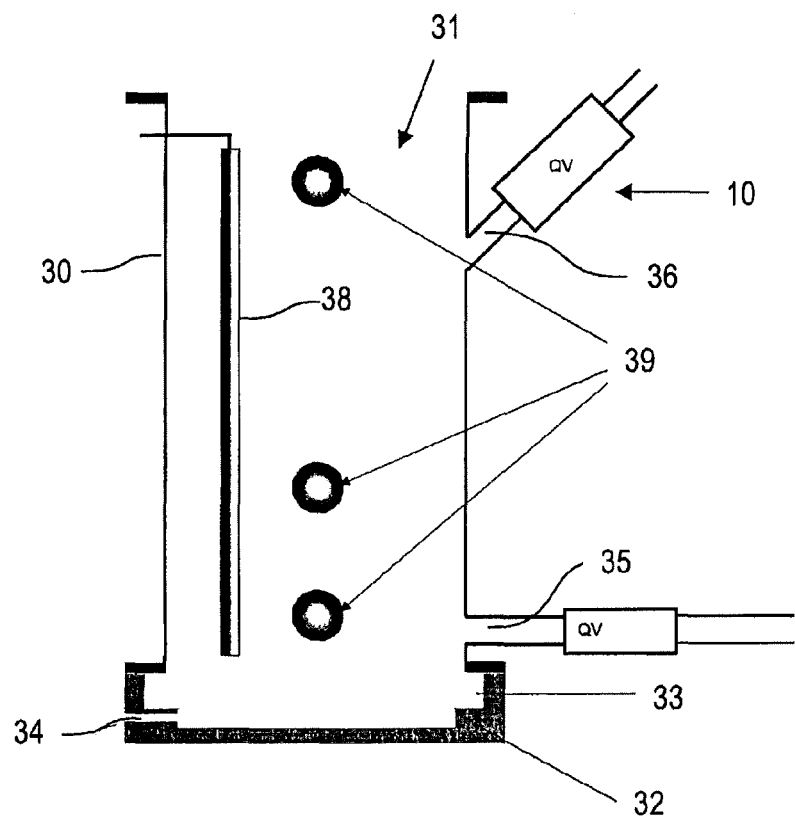
FIG. 3 shows an exemplary feed container suitable for the arrangements of FIG. 1 and FIG. 2.

Similar advantages in relation to a precisely metered filling such as by way of a blow pot are achieved when instead a powder metering pump is connected downstream of a feed container which is formed for fluidising purposes only, for example where so-called DDF pumps or other metering pumps which convey substances pursuant to the dense flow principle having suction/pressure changes are suitable for this purpose, as are generally known, for example, from EP 1 427 536 B1, WO 2004/087331 A1 or FIG. 3 of DE 101 30 173 A1. Such pumps, and in particular DDF pumps, have the advantage of a particularly powder-friendly and precisely meterable powder transport over relatively large distances, typically as a central supply unit for a painting booth up to approximately 24 meters (m) in length.

If the feed container is arranged beneath a storage container for the auxiliary material and between these containers there may be located sealing, mechanical conveying devices, such as, for example, a rotating batch metering unit or a screw conveyor. This arrangement advantageously allows generally continuous re-filling and simultaneous conveyance of the auxiliary material to the reception containers.

Figure 1:
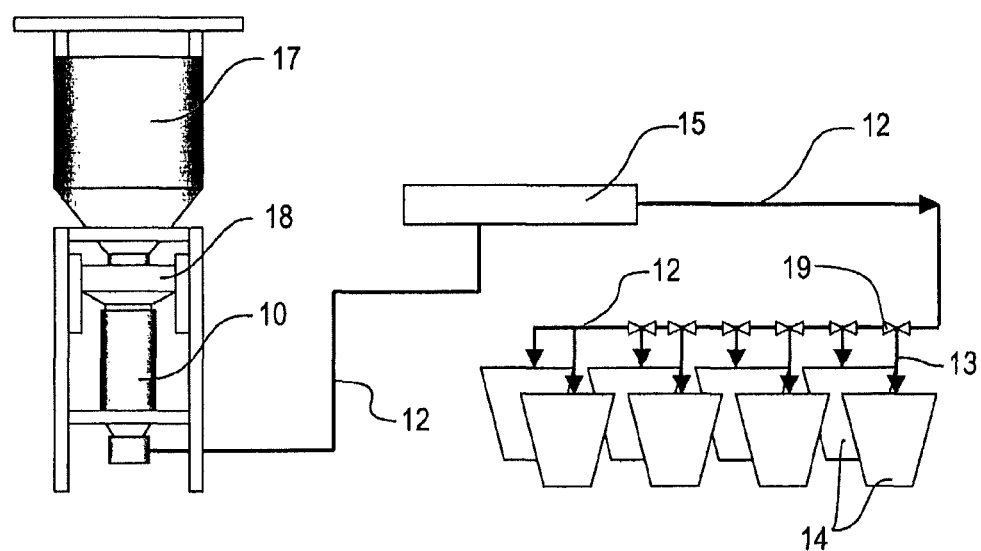
FIG. 1 shows a schematic illustration of an exemplary container and line arrangement.

Referring now to the drawings, an exemplary arrangement illustrated in FIG. 1 is used to convey an auxiliary material which is used for the reception and/or bonding of the wet paint overspray which has entered the exhaust air flow in the spraying booth of a coating system and in the case of its dry separation in a filter apparatus. Auxiliary particles, e.g., as generally described in PCT/EP2008/005954 and DE 10 2007 040 153.3, may be used, which are characterised by a cavity structure and a large inner surface relative to their outer dimensions and/or react chemically with the overspray. However, the exemplary illustrations are also suitable for other pre-coat particles, e.g., as generally disclosed by WO 2007/039276 A1. In addition to the particulate material, further particles and/or liquid or gaseous auxiliary agents can be used to charge the overspray, for example as generally described in PCT/EP2008/005954 and DE 10 2007 040 153.3), the entire disclosures of which are hereby expressly incorporated by reference in their entireties. The spraying booth and the separation principle may generally correspond to that disclosed by WO 2007/039276 A1, except for the differences described hereinafter which means that a more detailed description in this respect is superfluous.

The illustrated arrangement generally includes a feed container 10 for the auxiliary material which is fresh—i.e., it has not yet come into contact with the wet paint overspray—and is referred to hereinafter as pre-coat material. This pre-coat material is not to be sprayed by means of a nozzle arrangement into the exhaust air stream of the spraying booth as in the known systems but rather is to be conveyed directly into the reception containers 14, illustrated in the shape of funnels, via a main line 12 and branch lines 13, which containers can be distributed beneath the application region and the booth base, e.g., over the entire horizontal cross-sectional surface of the booth, in this respect in a similar manner to the reception containers for used pre-coat material of the system disclosed by WO 2007/039276 A1.

The feed container 10 may be formed in a manner known, e.g., as a blow pot or as a simple fluidising container as will be explained in more detail hereinafter with reference to FIG. 3. While a blow pot can be emptied by way of the pressure of the fluidising air, otherwise a powder metering pump 15 may be connected downstream of the fluidising container for the purposes of conveying material, the metering pump being, for example the DDF pump generally described in WO 03/024612 A1, or another known dense flow pump of the type mentioned above.

To fill the feed container 10, a larger storage container (cask) 17 for the fresh pre-coat material may be disposed e.g., vertically above the feed container, wherein in the simplest case the material can trickle from the storage container into the feed container 10 through an opening which can be closed by, for example, a flap. However, the feed container 10 may advantageously be continuously refilled even during the conveyance of material in order to prevent opening the loss of time during operation. For this purpose, a mechanical conveying device 18, such as, for example, a screw conveyor or in particular a rotating batch metering unit can be located between the two containers 10 and 17. When using such a conveying device, a desired filling amount can be advantageously adjusted, in the case of a rotating batch metering unit via the predeterminable filling amount per cell.

The main line 12 may generally include or consist of flexible hoses, and in the example illustrated in FIG. 1, generally terminates at the branch lines 13. The branch lines 13, in turn, each lead to a respective container 14. In the case of one exemplary illustration which in practice uses a DDF pump, hoses having an inner diameter up to approximately 14 millimeters (mm), for example between about 6 mm to 12 mm, can be used. In the case of the alternatively possible use of a blow pot, the inner diameter of the hoses can be approximately 12 mm to approximately 42 mm. The branch lines 13 can be tubular and, in accordance with the illustration, are connected to powder distributors 19 distributed in sequence along the main line 12, which powder distributors can be mechanical squeeze distributors. Instead of a squeeze distributor 19, two similarly simple squeeze valves can also be provided in the branch line or in the main line upstream or downstream of the branch lines. For the last reception container 14 in the row, no branching is necessary since it can be filled directly via the end of the main line 13. Two or more containers can also be filled simultaneously, for example the last and penultimate containers in the drawing.

The main line 12 can be split into different branches, for example into two branches extending on the two sides of a painting booth.

In operation, the main line 12 and all the branch lines 13 are generally empty at first. When a particular reception container 14 is to be filled, the main line is generally blocked behind the relative branching point by squeezing, e.g., with one of the squeeze distributors 19, the relevant branch line 13 is opened and the pre-coat material is then conveyed from the feed container 10 into the relevant reception container 14.

Finally, the described line path into the relevant container may be emptied and flushed. The "dead-end principle" of this exemplified embodiment is advantageous in that the filling amount is always precisely determined and meterable and that the line path cannot be blocked since flushing generally always occurs in the reception container.

Figure 2:
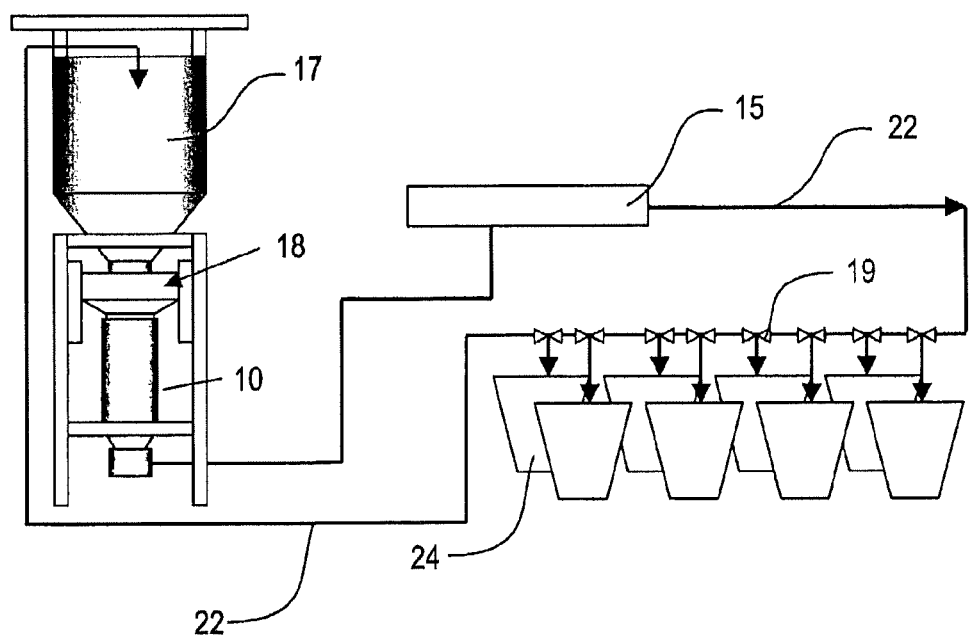
FIG. 2 shows a modification of the exemplary illustration of FIG. 1.

The modified exemplified embodiment illustrated in FIG. 2 differs from FIG. 1 substantially only in that the main line 22 does not terminate at the last reception container 24 but rather leads back to the storage container 17. As a result, a continuous circular conveyance of the fresh pre-coat material from the storage container 17 via the feed container 10 and through the main line 22 back into the storage container 17 is possible. This is advantageous in that when one of the reception containers is required to be filled, the pre-coat material is generally immediately available at its branch line without a loss in time caused by flushing and filling the main line.

FIG. 3 illustrates an exemplary illustration of the feed container 10. It generally may include a cylinder 30 having any cross-sectional shape that is convenient, and having a filling opening 31 at the top which can be closed in a sealing manner and an air-permeable fluidising base 33 at the bottom above the container base 32. Beneath the fluidising base 33, the container may include a connection 34 for the fluidising air. In the lower container region there may likewise be a container outlet 35 for the pre-coat material which can be controlled by a squeeze valve QV.

For the use of the feed container 10 as a simple fluidising container, a vent opening 36 may be provided in the upper region, so that the pre-coat material can be sucked out of the container by the metering pump 15. When using the feed container 10 as a blow pot, the vent opening 36 may be, in contrast, closed by the squeeze valve QV provided at that location, so that the pre-coat material can be conveyed out of the container through the outlet 35 by way of the pressure of the fluidising air from the connection 34. In any case, during operation as a blow pot, the container 10 is generally closed at its top side in a pressure-tight manner, which can be achieved in particular using the aforementioned rotating batch metering unit which also seals during filling. However, sealing can also be effected using any other mechanical conveying devices instead that are convenient, as well as using double flap constructions which are likewise known.

In order to control the filling volume, the feed container 10 can contain a filling level probe 38 for generally continuously measuring the filling level over the entire container height and/or filling level sensors 39 placed at different heights for measuring at specific points. These devices for measuring the filling level generally allow a precisely metered filling and avoid undesired overfilling with considerably less outlay than the weighing devices provided in the case of known blow pots and similar containers.

As a difference to the system known from WO 2007/039276 A1, the reception containers 14 distributed beneath the application region over the booth cross-section can themselves be used to introduce the fresh pre-coat material into the exhaust air stream, containing the overspray, of the booth air. To this end, the paint-containing exhaust air can be fed directly into the reception container, for example, using baffle plates or the like, where the exhaust air mixes with the fluidised pre-coat material and from where it is then exhausted through a filter device (not shown) which can be arranged vertically beneath the application region directly above the reception containers 14. Filter devices may be employed, for example as generally described by WO 2007/039276 A1, which has already been mentioned above. It can be purposeful to additionally disperse the fluidised auxiliary material in the reception containers 14 by means of compressed air from the top by way of a nozzle arrangement, so that the auxiliary material is entrained by the booth air stream flowing through at that location and is fed to the filter. As described in PCT/EP2008/005954 and DE 10 2007 040 153.3, mentioned above, these dispersion nozzles can be advantageously used to inject a liquid or gaseous additional auxiliary fluid.

As can be seen from the above description, in these exemplary illustrations, a gas flow exiting the application region through the booth base can, immediately above the top side of the reception containers 14, directly be drawn into the filter device arranged at that location instead of being exhausted through the base of a mixing chamber located beneath the application region, as described in DE 42 11 465 C2 mentioned above. Furthermore, in the case of the exemplary illustrations, advantageously only fresh auxiliary material from the feed container 10 is directly conveyed into the reception containers 14, i.e., without being mixed with auxiliary material simultaneously recovered from the filter device.

The invention is not limited to the previously described exemplary embodiment. Rather, a multiplicity of variants and variations are possible, which likewise make use of the inventive idea and therefore come under the protective scope exemplary illustrations are not limited to the specific examples described above. Rather, a plurality of variants and modifications are possible, which likewise make use of the concepts of the exemplary illustrations and therefore fall under the scope of protection. Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be evident upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "the," etc. should be read to recite one or more of the indicated elements unless a claim recites an explicit limitation to the contrary.

The invention claimed is:

1. A device configured to supply a coating system with a particulate auxiliary material for charging an overspray which, when coating workpieces with liquid coating material, enters into an air or other gas flow flowing through an application region of the coating system, comprising:
at least one feed container configured to supply the particulate auxiliary material,
at least one reception container for receiving the particulate auxiliary material, the at least one reception container located beneath the application region, and
a line arrangement leading from the at least one feed container to the at least one reception container, the line arrangement configured to convey the particulate auxiliary material from the at least one feed container to the at least one reception container;
wherein the line arrangement includes a main line from which branch lines lead to the at least one reception container.

2. The device according to claim 1, wherein the at least one reception container is located in a region where the air or other gas flow exits the application region.

3. The device according to claim 2, further comprising a filter device arranged beneath the application region and above the at least one reception container arrangement, the filter device configured to receive the flow charged with the particulate auxiliary material.

4. The device according to claim 1, wherein the at least one feed container is one of a blow pot and a powder pump configured to convey substances pursuant to one of a dense flow principle and a suction/pressure principle, the one of the blow pot and the powder pump in fluid communication with the line arrangement.

5. The device according to claim 1, wherein the at least one reception containers is configured to fluidize the particulate auxiliary material.

6. The device according to claim 1, wherein the line arrangement leads from the at least one reception container back to the at least one feed container and a storage container connected upstream of the feed container.

7. The device according to claim 1, wherein the line arrangement includes a flexible hose arrangement.

8. The device according to claim 1, wherein the line arrangement contains squeeze distributors configured to control particulate auxiliary material flow to the branch lines.

9. The device according to claim 1, further comprising a storage container for the particulate auxiliary material, the feed container disposed beneath the storage container, and further comprising one of a closable flap arrangement, a mechanical conveying device, a rotating batch metering unit, and a screw conveyor.

10. The device according to claim 1, wherein the at least one feed container includes a filling level device configured to measure the filling level of the feed container.

11. The device according to claim 10, wherein the filling level device includes one of a probe for continuously measuring the filling level over the at least one feed container height and at least one filling level sensor placed at different heights.

12. The device according to claim 1, wherein the at least one reception container is a plurality of reception containers.

13. The device according to claim 12, wherein the reception containers are distributed beneath a cross-sectional surface of a paint booth.

* * * * *